United States Patent
Inoue et al.

(10) Patent No.: US 9,052,179 B2
(45) Date of Patent: Jun. 9, 2015

(54) OPTICAL COHERENCE TOMOGRAPHY APPARATUS AND METHOD

(71) Applicant: CANON KABUSHIKI KAISHA, Tokyo (JP)

(72) Inventors: Yukihiro Inoue, Yokohama (JP); Minoru Yoshii, Tokyo (JP); Eiichi Fujii, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/725,856

(22) Filed: Dec. 21, 2012

(65) Prior Publication Data

US 2013/0169973 A1    Jul. 4, 2013

(30) Foreign Application Priority Data

Dec. 28, 2011  (JP) ................. 2011-287923

(51) Int. Cl.
*G01B 11/02*     (2006.01)
*G01B 9/02*      (2006.01)

(52) U.S. Cl.
CPC ................. *G01B 9/02091* (2013.01)

(58) Field of Classification Search
CPC ................................................. G01B 9/02091
USPC ........................................................ 356/497
See application file for complete search history.

(56) References Cited

U.S. PATENT DOCUMENTS

| | | | |
|---|---|---|---|
| 2008/0117424 A1* | 5/2008 | Teramura et al. | 356/450 |
| 2010/0014051 A1* | 1/2010 | Rathjen | 351/206 |
| 2011/0149291 A1* | 6/2011 | Yamakita | 356/450 |
| 2011/0304853 A1* | 12/2011 | Yamada et al. | 356/479 |

FOREIGN PATENT DOCUMENTS

| | | |
|---|---|---|
| JP | 2007-24677 A | 2/2007 |
| JP | 2008-153379 A | 7/2008 |

* cited by examiner

*Primary Examiner* — Tarifur Chowdhury
*Assistant Examiner* — Omar Nixon
(74) *Attorney, Agent, or Firm* — Canon USA Inc IP Division (57) ABSTRACT

An OCT apparatus includes, in addition to a first light source that changes a wavelength of light that is emitted, a second light source that emits light having a particular wavelength. The OCT apparatus is formed so that, when light having the particular wavelength is emitted from the first light source, the light emitted from the second light source is detected by a second optical detector.

9 Claims, 5 Drawing Sheets

OPTICAL COHERENCE TOMOGRAPHY APPARATUS AND METHOD

BACKGROUND OF THE INVENTION

1. Field of the Invention

The present invention relates to an optical coherence tomography apparatus and method.

2. Description of the Related Art

An optical coherence tomography apparatus (hereunder may be referred to as the "OCT apparatus") is an apparatus for obtaining a tomogram of an object by making use of optical interference. Since an optical coherence tomography apparatus, for example, provides spatial resolution of a micron order and exhibits noninvasiveness, it is actively being studied in the medical field.

An optical coherence tomography apparatus of a swept source type (hereunder may be referred to as the "SS-OCT apparatus") provides tomogram information at a certain measurement point of an object by using a tunable light source that changes wavelength and by performing scanning using a wavelength of light with which a certain measurement point is illuminated. Since the SS-OCT apparatus does not use a spectroscope that separates interference light, the SS-OCT apparatus has little loss in light quantity. When the SS-OCT apparatus is used to obtain a two-dimensional image, it is necessary to scan a surface of an object with illumination light.

When a two-dimensional image is to be obtained in an existing SS-OCT apparatus, wavelength scanning is started by using a signal (trigger signal) that provides a wavelength scanning start timing, that is, a Fourier transformation start timing. By causing a portion of light from a tunable light source to be divided, transmitting only a particular wavelength by a wavelength filter, and receiving the transmitted light by a photodiode, the trigger signal is generated at a timing in which the light is received by the photodiode, to determine the wavelength scanning start timing. Alternatively, by receiving by the photodiode specularly reflected light from a dispersive element disposed in a tunable light source device, the trigger signal is generated at a timing in which the light is received by the photodiode, to determine the wavelength scanning start timing (refer to Japanese Patent Laid-Open No. 2007-24677.

However, in the above-described methods, in order to obtain a signal that provides the Fourier transformation start timing, a portion of light required to obtain an actual OCT image is wasted, as a result of which the efficiency with which light emitted from the tunable light source is reduced.

SUMMARY OF THE INVENTION

An example of the present invention focuses on this problem, and provides an OCT apparatus in which the efficiency with which light emitted from a tunable light source is not reduced even if a signal that provides a Fourier transformation start timing is obtained.

According to an aspect of the present invention, there is provided an optical coherence tomography apparatus (OCT apparatus) including a first light source that changes a wavelength of light; an interference optical system that divides the light from the first light source into illumination light, used for illuminating an object, and reference light, and generates interference light by the reference light and reflected light of the illumination light that has illuminated the object; a first optical detector that receives the interference light; and an information obtaining section that obtains information of the object on the basis of a temporal waveform of an intensity of the interference light, wherein the first light source is a light source that includes a member with an optical gain from which light having a wavelength bandwidth exits, and that, of the light that exits from the member, selects and emits light having a predetermined wavelength using a wavelength selection optical system that selects the light having the predetermined wavelength; a second light source that emits light having a particular wavelength to the wavelength selection optical system; and a second optical detector that detects the light emitted from the second light source, wherein the optical coherence tomography apparatus is formed so that, when light having the particular wavelength is emitted from the first light source, the light emitted from the second light source is detected by the second optical detector.

The OCT apparatus according to an embodiment of the present invention includes, in addition to the first light source that changes a wavelength of light, a second light source that emits light having a particular wavelength. The OCT apparatus is formed so that, when light having the particular wavelength is emitted from the first light source, the light emitted from the second light source is detected by the second optical detector. Therefore, it is possible to provide an OCT apparatus in which the efficiency with which light emitted from the tunable light source is not reduced, even if a signal that provides a Fourier transformation start timing is obtained.

Further features of the present invention will become apparent from the following description of exemplary embodiments with reference to the attached drawings.

DESCRIPTION OF THE EMBODIMENTS

Exemplary embodiments of the present invention will hereunder be described. However, the present invention is not limited thereto.

Figure 1A:
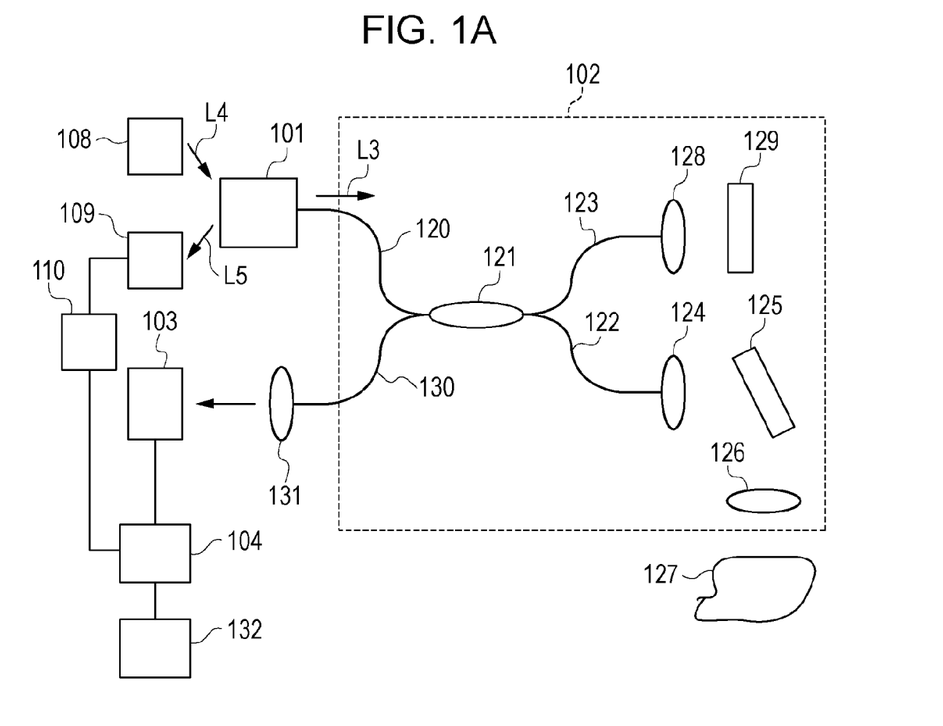
FIGS. 1A and 1B are schematic views of an OCT apparatus and a portion thereof according to an exemplary embodiment of the present invention.

The structure of an OCT apparatus according to an exemplary embodiment will be described with reference to FIGS. 1A and 1B.

The OCT apparatus according to the exemplary embodiment includes, at least, a first light source 101, an interference optical system 102, a first optical detector 103, an information obtaining section 104, a second light source 108, and a second optical detector 109. The first light source 101 includes, at least, a member that generates light having a wavelength bandwidth (hereunder may be referred to as "gain medium") 105, and a wavelength selection optical system (refer to FIG. 1A). Although, in the exemplary embodiment, an optical system including a dispersive element 106 and a wavelength selection element 107 corresponds to the wavelength selection optical system, the wavelength selection optical system may have any structure as along as it is capable of selecting light having a predetermined wavelength. For example, when the first light source 101 is formed into a resonator structure by providing two half mirrors and a member from which light having a wavelength bandwidth exits, the wavelength selection optical system includes two half mirrors. In this structure, the wavelength selection optical system only includes the wavelength selection optical system, that is, two half mirrors, so that a dispersive element is not required.

Although not illustrated, the information obtaining section 104 includes a Fourier transformer. Here, "the information obtaining section 104 includes a Fourier transformer" means that the information obtaining section 104 is capable of performing Fourier transformation on input data, so that the form of the information obtaining section 104 is not particularly limited. In one example, the information obtaining section 104 may include a computing section that is capable of performing Fourier transformation. More specifically, the computing section is a computer that includes a central processing unit (CPU), and this computer may incorporate an application providing a Fourier transformation function. In another example, the information obtaining section 104 may include a Fourier transformation circuit having a Fourier transformation function.

Next, a method of obtaining information of an object 127 using the OCT apparatus according to the exemplary embodiment will be described.

Light (L3) emitted from the first light source 101 is transmitted through the interference optical system 102, so that the emitted light (L3) becomes interference light including the information of the object 120 to be measured, and the interference light is output. The interference light is received by the first optical detector 103. Data of temporal waveform of the intensity of the received interference light is transmitted from the first optical detector 103 to the information obtaining section 104. The information obtaining section 104 obtains the data of the temporal waveform of the intensity of the received interference light, and performs Fourier transformation on the data, to obtain the information of the object 127 (for example, tomogram information). In this way, by changing the wavelength at the first light source 101, information of a one-dimensional tomogram of the object 127 is obtained. Information of a two-dimensional tomogram can be obtained by obtaining information of a tomogram for when the position of light with which the object 127 is illuminated is changed to a direction that is perpendicular to an optical axis of the light with which the object 127 is illuminated.

In the first light source 101, the wavelength of the emitted light is changed by the following structure. First, light (L1) that is emitted from the member 105 that generates light having a wavelength bandwidth is dispersed into lights (L2) in accordance with wavelengths by the dispersive element 106. The expression "the light (L1) is dispersed in accordance with wavelengths by the dispersive element 106" means that light that illuminates the dispersive element 106 is such that lights having different wavelengths reach different locations of the wavelength selection element 107.

Figure 1B:
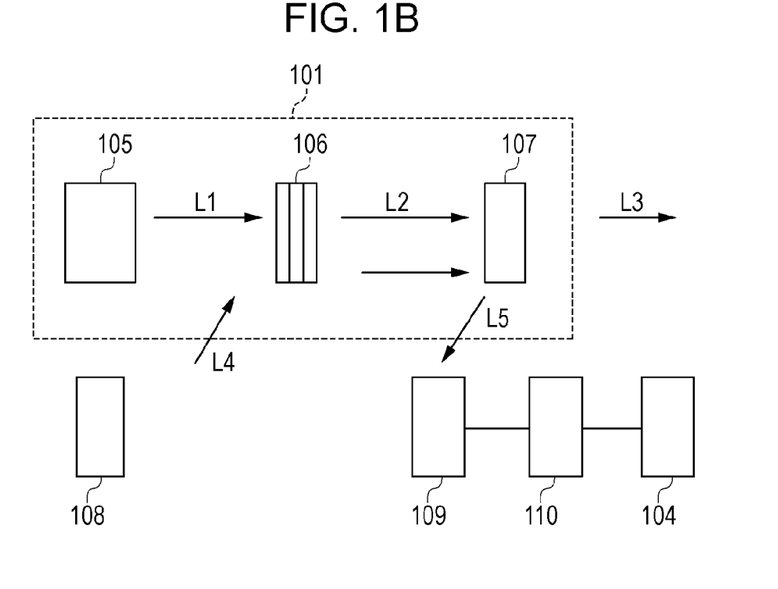

Of the lights (L2) dispersed by the dispersive element 106 and having different wavelengths, the light having a wavelength selected by the wavelength selection element 107 is emitted as the light (L3) (see FIG. 1B). Here, by forming the OCT apparatus so that the wavelength selected by the wavelength selection element 107 changes with time, the wavelength of the light that is emitted from the first light source 101 can be changed.

Light (L4) emitted from the second light source 108 and having a particular wavelength is, first, emitted to the dispersive element 106. The second light source 108 is a light source that emits light having a particular wavelength, and is, ideally, a monochromatic light source. The light having the particular wavelength is selected by the wavelength selection element 107 at a certain timing, and light (L5) is emitted from the wavelength selection element 107. The arrows indicated by L4 and L5 represent the light having the same particular wavelength.

Here, if the OCT apparatus is formed such that light emitted from the second light source 108 is detected by the second optical detector 109 when light having a particular wavelength is emitted from the first light source 101, the timing in which the light having the particular wavelength is emitted from the first light source can be known.

The OCT apparatus according to the exemplary embodiment also includes a signal transmitter 110 that transmits to the information obtaining section 104 information regarding the time when the light emitted from the second light source 108 is detected by the second optical detector 109. From the signal transmitter 110, the information obtaining section 104 obtains a signal that provides a Fourier transformation start timing. By this, on the basis of the information transmitted from the signal transmitter 110, that is, the information regarding the time when the light emitted from the second light source is detected by the second optical detector, the information obtaining section 104 can obtain information of the object 127. The time when the light emitted from the second light source is detected by the second optical detector is a time when the light having the particular wavelength is emitted from the first light source 101. Therefore, on the basis of information regarding the time when the light having the particular wavelength is emitted from the first light source 101, the information obtaining section 104 can perform Fourier transformation on data of temporal waveform of the intensity of interference light.

Here, the wavelength of light for when the first light source 101 (which changes the wavelength of the emission light) starts emitting the light, the wavelength of the light for when the emission of the light is completed, and the range of the wavelength of the light that is emitted are often not constant. Therefore, among pieces of data of temporal waveform of the intensity of interference light, it cannot be known which data obtained at what timing corresponds to which data obtained by emission of light having what wavelength.

In order to obtain accurate information of a two-dimensional tomogram of the object 127, it is desirable that, of the obtained pieces of data of the temporal waveform of the intensity of the interference light, pieces of data of the temporal waveform of the intensity of the interference light corresponding to the same wavelength range (such as from 800 nm to 880 nm) be subjected to Fourier transformation. Therefore, with the particular wavelength being set at a wavelength (800 nm) corresponding to data for starting the Fourier transformation or at a wavelength (880 nm) corresponding to data for completing the Fourier transformation, it is possible to perform the Fourier transformation on the pieces of data having the same wavelength range.

In other words, the information obtaining section 104 can perform the Fourier transformation on the pieces of data corresponding to the same wavelength range as result of obtaining the information of the object 127 that is obtained when light having a wavelength in a predetermined range is emitted from the first light source 101, and setting the particular wavelength to a shortest wavelength or a longest wavelength among the wavelengths of the predetermined range.

Details will hereunder be described using a specific example.

For example, the wavelength of the light that is emitted from the second light source 108 is $\lambda_1$. The position of each object is adjusted, so that, when the light (L1) exits from the member 105 and the wavelength of the light (L3) that is selected by the wavelength selection element 107 is $\lambda_1$, the light (L5) that is emitted from the second light source 108 and selected by the wavelength selection element 107 is received by the second optical detector 109. When the second optical detector 109 has received the light (L5) having the particular wavelength, the signal transmitter 110 transmits a signal to the information obtaining section 104. If the OCT apparatus is formed in this way, the information obtaining section 104 can obtain information regarding the time when the wavelength of the light emitted from the first light source 103 is $\lambda_1$.

There are various advantages if the information obtaining section 104 can obtain the time when the wavelength of the light that is emitted from the first light source is $\lambda_1$. For example, if the wavelength $\lambda_1$ of the light is a sweep start wavelength of the wavelength of the light that is subjected to sweeping for obtaining the tomogram of the object 127, it can be known when the light having the sweep start wavelength has been emitted from the first light source 103, so that it can be known which data obtained at what time among the pieces of data of the temporal wavelength of the intensity of the interference light, obtained by the information obtaining section 104, is to be subjected to Fourier transformation. That is, the signal that is received by the second optical detector 109 and that is transmitted from the signal transmitter 110 to the information obtaining section 104 can be used as a trigger signal. The data of the temporal waveform of the intensity of the interference light is converted into data of the temporal waveform of a voltage of the received light at the first optical detector 103. Therefore, although, to be exact, the information obtaining section 104 obtains the data of the temporal waveform of the received voltage from the first optical detector 103, it will be described below that the information obtaining section 104 obtains the data of the temporal waveform of the intensity of interference light.

If a wavelength sweep bandwidth is made longer by combining the first light source 101 with a third light source that performs sweeping on light of a wavelength bandwidth differing from and partly overlapping the wavelength bandwidth of the light emitted from the first light source 101, the OCT apparatus according to the exemplary embodiment is applicable. For example, the OCT apparatus according to the exemplary embodiment is applicable to an OCT apparatus using a light source (1) (the first light source 103 or the third light source) that can perform sweeping on light having a wavelength of from 800 nm to 900 nm and a light source (2) (the third light source or the first light source 103) that can perform sweeping on light having a wavelength of from 880 nm to 1000 nm.

In this case, first, wavelength sweeping is performed from 800 nm to 900 nm using the light source (1). After the wavelength sweeping using the light source (1) ends, the wavelength is swept from 880 nm to 1000 nm using the light source (2). At this time, pieces of data of temporal waveform of the intensity of interference light obtained by the information obtaining section 104 are such that data of the range of from 880 nm to 900 nm, data obtained using the light source (1), and data obtained using the light source (2) overlap.

Therefore, if the wavelength of the light that is emitted from the second light source 108 is 900 mm, it is possible to identify data for when light having a wavelength of 900 nm is emitted among pieces of data of the intensity of interference light obtained using the light source (2). Consequently, without performing Fourier transformation on data from 880 nm to not more than 900 nm obtained using the light source (2), Fourier transformation is started with the data for when the light having a wavelength of 900 nm is emitted from the light source (2).

If the wavelength of the light that is emitted from the second light source 108 is 880 nm, it is possible to identify data for when light having a wavelength of 880 nm is emitted from the light source (1) among the pieces of data of the intensity of interference light obtained using the light source (1). Therefore, it is possible not to perform Fourier transformation on data of from 880 nm to not more than 900 nm obtained using the light source (1) and not to use this data for obtaining a tomogram. That is, Fourier transformation is performed on data for up to when light having a wavelength of 880 nm is emitted from the light source (1). In this way, when the particular wavelength is the sweep start wavelength of the light source (2) or the sweep end wavelength of the light source (1), it is possible to realize a light source section having a wide wavelength sweep bandwidth provided by combining two wavelength swept light sources whose wavelength bandwidths to be swept differ from each other and that partly overlap each other.

Within a range in which the object of the present invention is achieved, it is possible to provide optical elements and optical systems other than those mentioned above (the first light source 101, the interference optical system 102, the first optical detector 103, the information obtaining section 104, the second light source 108, the second optical detector 109, the gain medium 105, the dispersive element 106, and the wavelength selection element 107).

Exemplary OCT Apparatus

The time from when light oscillates from the light source 101 to when information regarding a tomogram of an object to be measured is obtained is described in detail below with reference to FIGS. 1A and 1B.

Light emitted from the first light source 101 that changes the wavelength of light passes through a fiber 120, enters a coupler 121, and is divided into illumination light that passes through an illumination-light fiber 122 and reference light that passes through a reference-light fiber 123. The illumination light passes through a collimator 124 and becomes parallel light. The parallel light is reflected by a mirror 125. Light reflected by the mirror 125 passes through a lens 126, illuminates the object 127, and is reflected from each layer in the direction of a depth of the object 127. The reference light passes through a collimator 128, and is reflected by a mirror 129. In the coupler 121, interference light is generated by reflected light from the object 127 and reflected light from the mirror 129. The interference light passes through the fiber 130, is converged by passing through the collimator 131, and is received by the first optical detector 103. Information regarding the intensity of the interference light received by the first optical detector 103 is converted into electrical information. The electrical information is sent to the information obtaining section 104. The information obtaining section 104 reads out a temporal waveform of the intensity of the interference light. Since the temporal waveform of the intensity of the interference light is actually converted into a temporal waveform of a voltage of the received light by the first optical detector 103, the information obtaining section 104 reads out the temporal waveform of the voltage of the received light.

Next, the Fourier transformer or the computing section that is capable of performing Fourier transformation performs Fourier transformation on the temporal waveform that has been read out by the information obtaining section 104, so that information regarding a tomogram of the object 127 is obtained. A value that is obtained by performing the Fourier transformation on the temporal waveform data corresponds to a frequency component included in the interference light. The intensity of light of each frequency component is proportional to the difference between the length of an optical path where the light exits from the coupler 121, is reflected by an object surface, and reaches the coupler 121 and the length of an optical path where the light 121 exits from the coupler 121, is reflected by the mirror 129, and reaches the coupler 107. Therefore, as the information regarding the tomogram of the object, it is possible to obtain, for example, information regarding the relationship between the length from the object surface in the direction of the depth and the intensity of the reflected light from each layer of the object 127.

The tomogram information may be sent to an image display 132 from the information obtaining section 104, and displayed on the image display 132 as an image. By scanning the mirror 125 with illumination light in a plane that is perpendicular to a direction in which the illumination light is incident upon the object 127, it is possible to obtain a three-dimensional tomogram of the object 127 to be measured. The light source 101 may be controlled by the information obtaining section 104 through an electric circuit (not shown). Although not shown, it is possible to sequentially monitor the intensity of the light that is emitted from the light source 101 and use the data regarding the intensity in correcting the amplitude of an interference light intensity signal.

Member that Generates Light Having a Wavelength Bandwidth (Gain Medium)

Although the gain medium that is used in the exemplary embodiment is not particularly limited, a typical example thereof is a semiconductor optical amplifier (hereunder abbreviated as "SOA"). Other gain media which may be used are, for example, an optical fiber that is doped with a rare earth element (ions) including, for example, erbium or neodymium; and an optical fiber that performs amplification using a dye that is added to the interior of the optical fiber.

When the light emitted from the second light source is incident upon the member, the wavelength of the light that exits from the member from where light having a wavelength bandwidth exits becomes the same as the wavelength of the light emitted from the second light source. Therefore, it is desirable that the OCT apparatus be formed so that the light emitted from the second light source is not incident upon the member.

The optical fiber doped with a rare earth element is suitable for obtaining good noise characteristics with high gain. The optical fiber to which a dye is added increases the selectivity of a variable wavelength by selecting, for example, a fluorescent coloring material or a host material as appropriate.

As the gain medium in the exemplary embodiment, it is desirable to use a small SOA that is capable of high-speed control. As the SOA, both a cavity optical amplifier and a traveling-wave type optical amplifier may be used. For the material of the SOA, for example, a compound semiconductor used to form a general semiconductor laser may be used. More specifically, the compound semiconductor may be an InGaAs semiconductor, an InAsP semiconductor, a GaAlSb semiconductor, a GaAsP semiconductor, an AlGaAs semiconductor, or a GaN semiconductor. The SOA that is used may be selected as appropriate from those having gain center wavelengths of, for example, 840 nm, 1060 nm, 1300 nm, and 1550 nm in accordance with, for example, the use of the light source.

First Light Source

Although the first light source in the exemplary embodiment that may be used is not particularly limited, any light source may be used for the first light source as long as the light source is capable of varying wavelengths. It is desirable to use a light source that is capable of varying wavelengths at high speeds and that emits light having a wavelength line width that is narrow. For example, an external-cavity-type tunable light source including a gain medium and a wavelength selection element, or a vertical cavity surface emitting laser (hereunder may be abbreviated as "VCSEL") capable of selecting a wavelength may be used.

Second Light Source

Although the second light source according to the exemplary embodiment that may be used is not particularly limited as long as the light source is capable of emitting light of a particular wavelength, it is desirable to use a laser diode (LD). Among laser diodes, it is more desirable to use a laser diode that stably emits light having a particular wavelength and that emits light having a narrow wavelength line width. For example, it is possible to use a distributed feedback laser diode (hereunder may be abbreviated as "DFB-LD") having a structure in which periodic changes in refractive index occur in an upper portion or a lower portion of an active layer that provides optical gain, and in which only a particular wavelength component is selectively reflected. It is also possible to use a distributed Bragg reflector laser diode (hereunder may be abbreviated as "DBR-LD") having a structure in which periodic changes occur in refractive indices at both end surfaces of an active layer and in which only a particular wavelength component is selectively reflected. By using a light source that emits light having a narrow wavelength line width as mentioned above, it is possible to stably generate a stable trigger signal with good time precision.

Optical Resonator

In addition to the linear resonator described in the exemplary embodiment, a ring resonator or a σ resonator may also be used as an optical resonator that may be used in the exemplary embodiment. In addition to a resonator using an optical fiber, for example, a resonator that uses an optical system that propagates light in air or in a vacuum using a mirror or a slab waveguide may be used as the ring resonator.

Object

The object in the exemplary embodiment is one to be measured using the OCT apparatus according to the exemplary embodiment. The type of object is not particularly limited. The object may be part of a living body, such as an eyeball, the skin, or a tooth.

Use of OCT Apparatus

The OCT apparatus according to the exemplary embodiment may be used in, for example, ophthalmological photography, dental photography, or skin photography.

Exemplary First Light Source

Figure 2A:
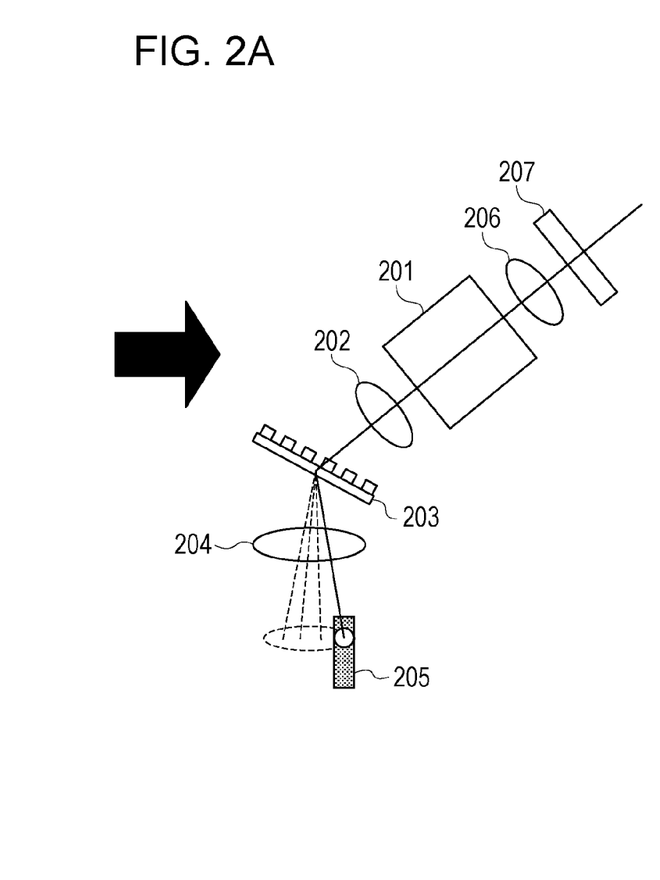
FIGS. 2A and 2B are schematic views of an exemplary first light source and an exemplary second light source in an OCT apparatus according to an exemplary embodiment of the present invention.
Figure 2B:
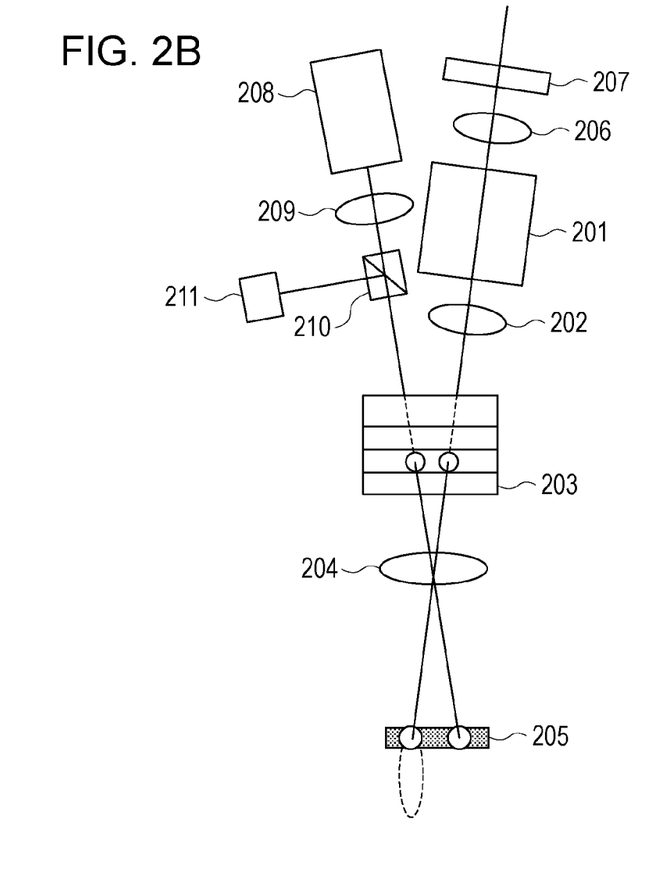

FIGS. 2A and 2B are schematic views of an exemplary first light source and an exemplary second light source in an OCT apparatus according to an exemplary embodiment of the present invention. FIG. 2A shows the first light source as viewed from a direction that is perpendicular to the direction of an optical axis of light that is emitted from the first light source. In a light source device that corresponds to the first light source, first, light that exits from one of end surfaces of an optical amplifier 201 including a gain medium is incident upon a diffraction grating 203 (which is a dispersive element) through a collimator lens 202. Diffracted light from the diffraction grating 203 is converged at a condenser lens 204, and a slit mirror 205, serving as a wavelength selection element, is disposed at a focal position. The slit mirror 205 is a linear mirror. Instead of the slit mirror, it is possible to provide a device in which a slit is formed in a substrate and a mirror that reflects light is provided at the slit. The position where the mirror is situated may be a front surface of the substrate, a back surface of the substrate, or in the slit. In the mirror, of two principal surfaces of the substrate, the surface upon which light is incident corresponds to the front surface and the opposite surface corresponds to the back surface. What is mentioned about the slit mirror also applies below. FIG. 2B shows the first light source as viewed from a direction of a black arrow in FIG. 2A.

By the slit mirror 205 that is provided at the focal position, the diffracted light from the diffraction grating 203 is reflected, and returns to the optical amplifier 201. The wavelength of the diffracted light that is reflected at this time is a particular wavelength. Next, by moving the position of the slit mirror 205 with respect to the diffracted light from the diffraction grating 203, the wavelength of the light reflected by the slit mirror is made different from the particular wavelength. Accordingly, with the slit mirror being provided at a position where lights having shorter wavelengths among the diffracted light are converged, the slit mirror is moved at a constant speed towards a position where lights having long wavelengths are converged. This causes the wavelength of the light that is emitted from the first light source to change from a short wavelength to a long wavelength.

A portion of light that exits from the other end surface of the optical amplifier 201 is reflected by a partial reflecting mirror 207 through a collimator lens 206, and returns to the optical amplifier 201, and another portion thereof is transmitted through the partial reflecting mirror 207 through the collimator lens 206. That is, the first light source that is described here is formed so that the portion of the light transmitted by the partial reflecting mirror 207 is taken out as a light output. The partial reflecting mirror 207 is a mirror that transmits and reflects a portion of the light that is incident thereupon. This also applies below.

Here, as shown in FIG. 2B, an external light source 208, serving as a second light source, that stably outputs a particular wavelength is disposed. As the external light source, for example, a laser diode is used. Light output from the external light source 208 is incident upon the diffraction grating 203 through a collimator lens 209. The diffracted light incident upon the diffraction grating 203 is converged at the condenser lens 204, and the focal position where the light is converged by the condenser lens 204 and the position of the slit mirror 205 are made to coincide with each other. As shown in FIG. 2B, a chief ray of incident light that is incident upon the diffraction grating 203 from the optical amplifier 201 and a chief ray of incident light that is incident upon the diffraction grating 203 from the external light source 208 are disposed so as not to be parallel to each other. However, the chief rays are disposed at the same angle from a plane including a normal line to the diffraction grating 203 and a direction parallel to a grid in the diffraction grating 203. That is, the light output from the optical amplifier 201 and the light output from the external light source 208 are provided so that their diffraction angles with respect to the same wavelength component of the light outputs are the same. By disposing the chief rays in this way, a timing in which the light output from the external light source 208 (which outputs a particular wavelength) is reflected by the slit mirror 205 and a timing in which the light output from the optical amplifier 201 having the same wavelength component is reflected by the slit mirror 205 coincide with each other. That is, the same wavelength component of both of the light outputs are reflected by the slit mirror 205. The light emitted from the external light source 208 and reflected by the slit mirror 205 is reflected by a beam splitter 210, and reflected light thereof is converted into an electrical signal by a photoreceiver 211 serving as a second optical detector. By transmitting this electrical signal as a trigger signal to the information obtaining section (not shown), the information obtaining section obtains information regarding the wavelength of the light emitted from the light source device, and information regarding the time when the light having this wavelength has been emitted. As a result, from temporal waveform data of the intensity of interference light that is obtained by the information obtaining section, it is possible to select data corresponding to a sweep start wavelength.

In this way, it is possible to generate a trigger signal whose output is stable.

Optical Coherence Tomography Method

An optical coherence tomography method according an exemplary embodiment is an optical tomography method using the optical coherence tomography apparatus. The method includes at least the step of continuously changing the wavelength of light that is emitted from the first light source, the step of receiving interference light generated in the interference optical system by the optical detector, and the step of obtaining a temporal waveform of the intensity of the received interference light and performing Fourier transformation on the temporal waveform.

The method may include the step of transmitting the obtained data subjected to the Fourier transformation to the image display. When the method includes this step, it is possible to display the tomogram of the object to be measured.

The present invention will hereunder be described in detail with reference to practical forms.

First Practical Form

Figure 3A:
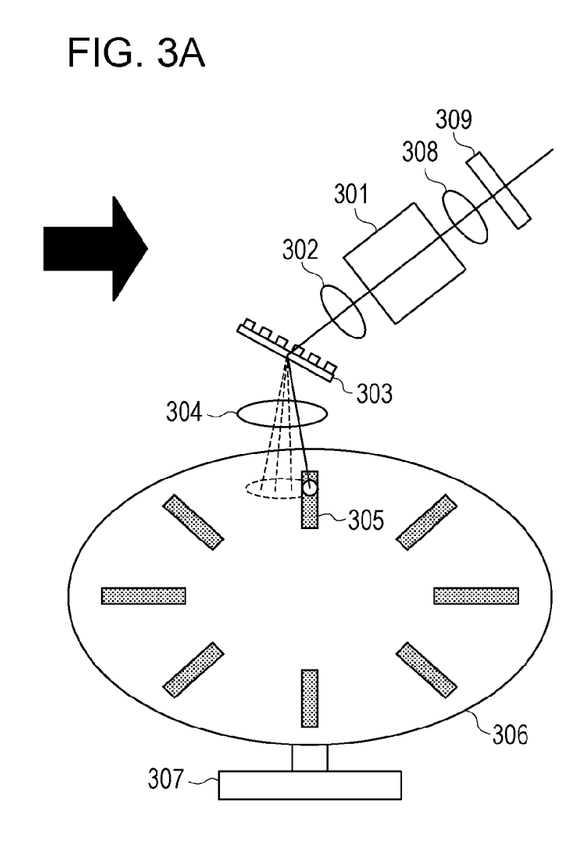
FIGS. 3A and 3B are schematic views of an exemplary first light source and an exemplary second light source in an OCT apparatus according to a first practical form of the present invention.
Figure 3B:
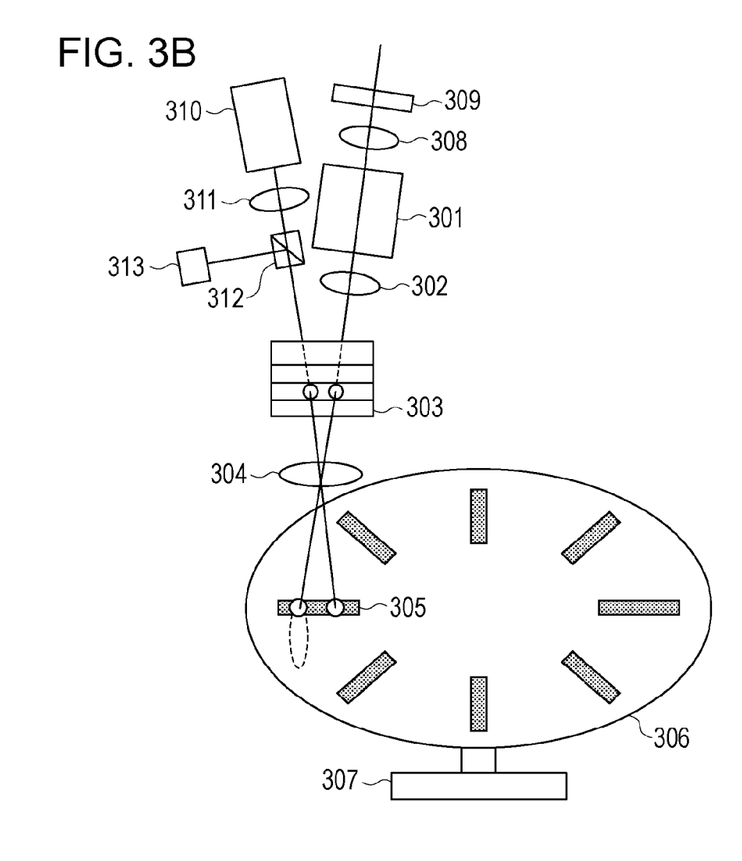

FIGS. 3A and 3B are schematic views of a first light source and a second light source in an optical coherence tomography apparatus according to a first practical form of the present invention. FIG. 3A shows the first light source, and FIG. 3B shows the first light source as viewed from below the plane of FIG. 3A.

A semiconductor optical amplifier 301 provides gain between a wavelength of 800 nm and a wavelength of 880 nm. A light output from one of end surfaces of the semiconductor optical amplifier 301 becomes parallel light by a collimator lens 302. The parallel light is incident upon a diffraction grating 303, and is diffracted at different angles in accordance with wavelengths of light. The number of grid lines of the diffraction grating 303 is 1200/mm. The diffracted light is converged by a condenser lens 304 having a focal length of 10 mm, and a slit mirror 305 is provided at a focal position where the light is converged. The width of the slit mirror 305 is 3 µm, and the length of the slit mirror 305 is 500 µm. The spot diameter of the converged light is 3 µm. A plurality of the slit mirrors 305 are disposed at equal distances along the circumference of a rotating disc 306. A driving section 307 drives the rotating disc 306 at a constant speed along a central axis thereof.

A portion of light that exits from the other end surface of the semiconductor optical amplifier 301 is reflected by a partial reflecting mirror 309 through a collimator lens 308, and returns to the semiconductor optical amplifier 301. Another portion of the light that exits from the other end surface of the semiconductor optical amplifier 301 is transmitted through the partial reflecting mirror 309 through the collimator lens 308. An external resonator is formed between the slit mirror 305 and the partial reflecting mirror 309, with a resonator length being 100 mm. The OCT apparatus is formed so that the light transmitted through the partial reflecting mirror 309 is taken out to the outside of the OCT apparatus as light output.

Light output from a semiconductor light source 310 that outputs a particular wavelength is incident upon the diffraction grating 303 through a collimator lens 311. Diffracted light is converged at a condenser lens 304, and the focal position and the position of the slit mirror 305 are made to coincide with each other. A chief ray of incident light that is incident upon the diffraction grating 303 from the semiconductor optical amplifier 301 and a chief ray of incident light that is incident upon the diffraction grating 303 from the semiconductor light source 310 are disposed so as to be symmetrical with respect to a plane including a normal line to the diffraction grating 303 and a direction perpendicular to a grid in the diffraction grating 303. At this time, with both of the chief rays being disposed at an angle of 0.573 degrees, the focal positions of spots of the chief rays on the slit mirror 305 are separated by a distance of 100 μm in the radial direction of a rotating disc 306. However, the light output from the semiconductor optical amplifier 301 and the light output from the semiconductor light source 310 are provided so that their diffraction angles with respect to the same wavelength component of the light outputs are the same. The light from the semiconductor light source 310 and reflected by the slit mirror 305 is reflected by a beam splitter 312, and reflected light thereof is converted into an electrical signal by a photoreceiver 313. By using this electrical signal as a trigger signal, it is possible to, without reducing the light output from the semiconductor optical amplifier 301, generate a stable trigger signal, so that a high-output wavelength swept light source can be realized.

Second Practical Form

Figure 4A:
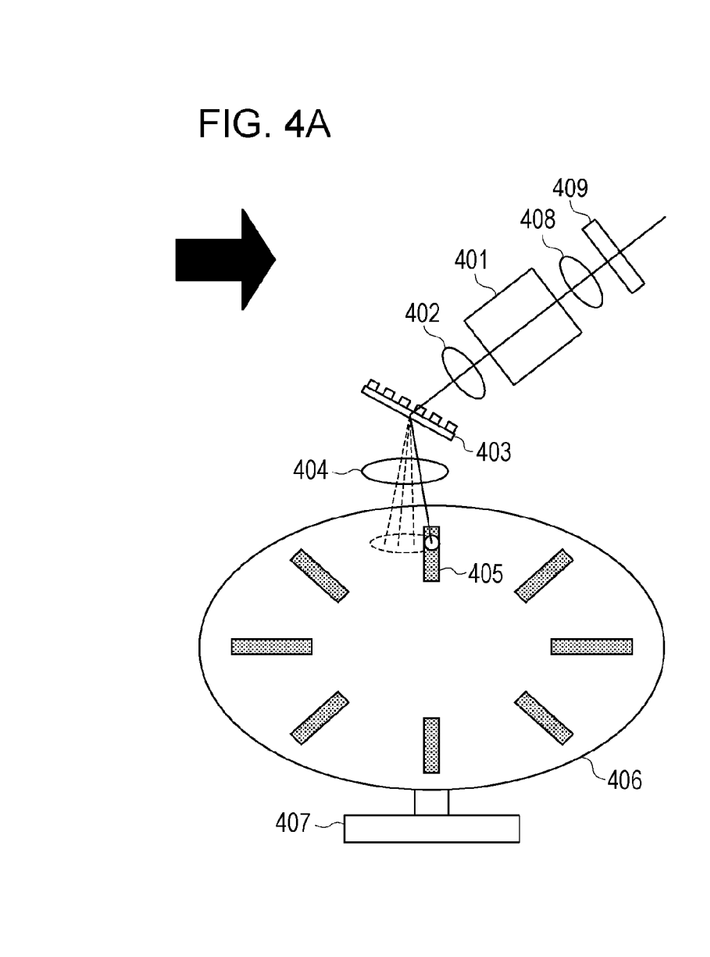
FIGS. 4A and 4B are schematic views of an exemplary first light source and an exemplary second light source in an OCT apparatus according to a second practical form of the present invention.
Figure 4B:
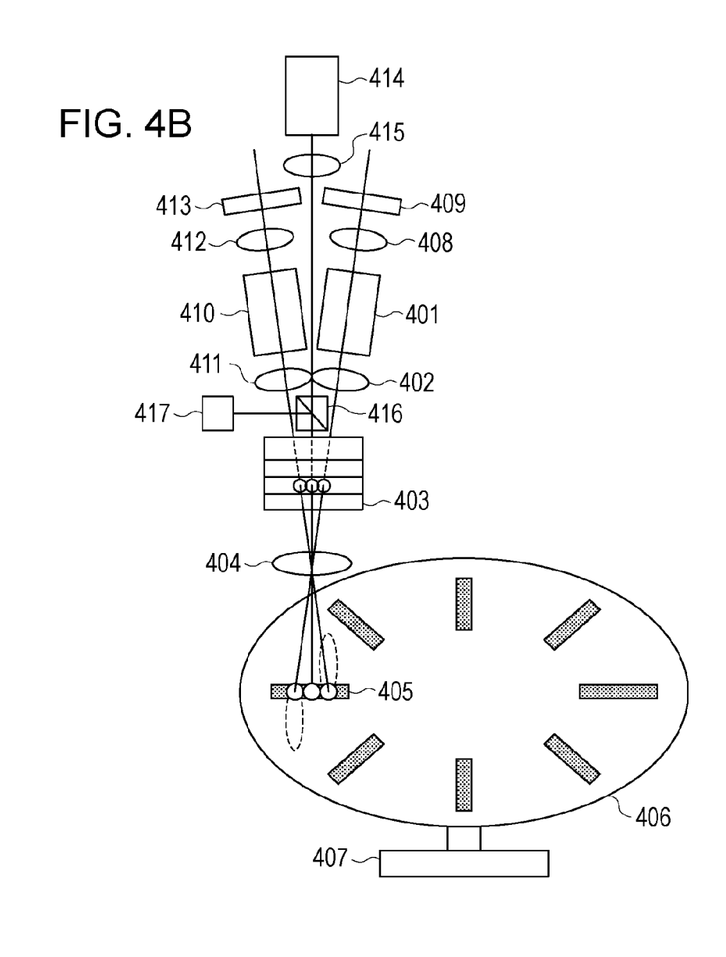

FIGS. 4A and 4B are schematic views of a first light source and a second light source according to a second practical form of the present invention. FIG. 4A is a front view thereof, and FIG. 4B shows the light source device as viewed from below the plane of FIG. 4A.

A semiconductor optical amplifier 401 provides gain between a wavelength of 780 nm and a wavelength of 850 nm. A light output from one of end surfaces of the semiconductor optical amplifier 401 becomes parallel light by a collimator lens 402. The parallel light is incident upon a diffraction grating 403, and is diffracted at different angles in accordance with wavelengths of light. The number of grid lines of the diffraction grating 403 is 1200/mm. The diffracted light is converged by a condenser lens 404, and a slit mirror 405 is provided at a focal position where the light is converged. The width of the slit mirror 405 is 3 μm, and the length of the slit mirror 405 is 500 μm. The spot diameter of the converged light is 3 μm. A plurality of the slit mirrors 405 are disposed at equal distances along the circumference of a rotating disc 406. A driving section 407 drives the rotating disc 406 at a constant speed along a central axis thereof.

A portion of light that exits from the other end surface of the semiconductor optical amplifier 401 is reflected by a partial reflecting mirror 409 through a collimator lens 408, and returns to the semiconductor optical amplifier 401. Another portion of the light that exits from the other end surface of the semiconductor optical amplifier 401 is transmitted through the partial reflecting mirror 409 through the collimator lens 408. An external resonator is formed between the slit mirror 405 and the partial reflecting mirror 409, with a resonator length being 100 mm. The OCT apparatus is formed so that the light transmitted through the partial reflecting mirror 409 is taken out to the outside of the OCT apparatus as light output.

A semiconductor optical amplifier 410 provides gain between a wavelength of 830 nm and a wavelength of 900 nm. A light output from one of end surfaces of the semiconductor optical amplifier 410 is incident upon a diffraction grating 403 through a collimator lens 411. The diffracted light is converged at the condenser lens 404, and the focal position and the position of the slit mirror 405 are made to coincide with each other. A chief ray of incident light that is incident upon the diffraction grating 403 from the semiconductor optical amplifier 401 and a chief ray of incident light that is incident upon the diffraction grating 403 from the semiconductor light source 410 are disposed so as to be symmetrical with respect to a plane including a normal line to the diffraction grating 403 and a direction perpendicular to a grid in the diffraction grating 403. At this time, with both of the chief rays being disposed at an angle of 1.146 degrees, the focal positions of spots of the chief rays on the slit mirror 405 are separated by a distance of 200 μm in a radial direction of a rotating disc 406. However, the light output from the semiconductor optical amplifier 401 and the light output from the semiconductor optical amplifier 410 are provided so that their diffraction angles with respect to the same wavelength component of the light outputs are the same.

A portion of light that exits from the other end surface of the semiconductor optical amplifier 410 is reflected by a partial reflecting mirror 413 through a collimator lens 412, and returns to the semiconductor optical amplifier 410. Another portion of the light that exits from the other end surface of the semiconductor optical amplifier 410 is transmitted through the partial reflecting mirror 413 through the collimator lens 412. An external resonator is formed between the slit mirror 405 and the partial reflecting mirror 413, with a resonator length being 100 mm. The OCT apparatus is formed so that the light transmitted through the partial reflecting mirror 413 is taken out to the outside of the OCT apparatus as light output.

Light output from a semiconductor light source 414 that outputs a particular wavelength is incident upon the diffraction grating 403 through a collimator lens 415. The diffracted light is converged at the condenser lens 404, and the focal position and the position of the slit mirror 405 are made to coincide with each other. A chief ray of incident light that is incident upon the diffraction grating 403 from the semiconductor optical amplifier 414 is disposed so as to exist in the plane including the normal line to the diffraction grating 403 and the direction perpendicular to the grid in the diffraction grating 403. However, the light output from the semiconductor optical amplifier 401, the light output from the semiconductor optical amplifier 410, and the light output from the semiconductor light source 414 are provided so that their diffraction angles with respect to the same wavelength component of the light outputs are the same. The light from the semiconductor light source 414 and reflected by the slit mirror 405 is reflected by a beam splitter 416, and reflected light thereof is converted into an electrical signal by a photoreceiver 417. By using this electrical signal as a trigger signal, it is possible to, without reducing the light output from the semiconductor optical amplifier 401 and the light output from the semiconductor optical amplifier 410, generate a stable trigger signal, so that a high-output wavelength swept light source can be realized. In addition, the electrical signal can be used for switching between driving of the semiconductor optical amplifier 401 and driving of the semiconductor optical amplifier 410. At this time, it is possible to selectively take out light outputs of two bandwidths by switching between the two semiconductor amplifiers in synchronism with a timing of this electrical signal.

Third Practical Form

In a third practical example, an exemplary optical coherence tomography apparatus using a light source according to the present invention will be described.

Figure 5:
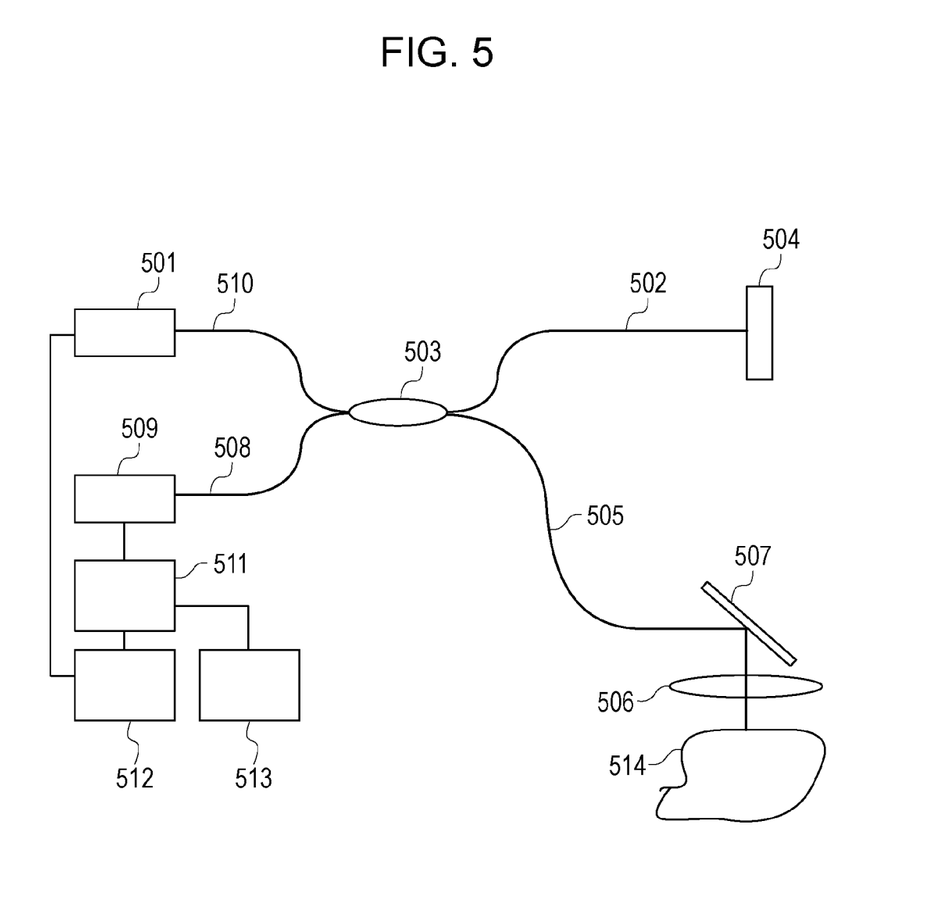
FIG. 5 is a schematic view of an OCT apparatus according to a third practical form of the present invention.

FIG. 5 is a schematic view of the OCT apparatus according to the third practical form.

The OCT apparatus shown in FIG. 5 basically includes a first light source section (including, for example, a tunable light source 501), a specimen measuring section (including, for example, an illumination position scanning mirror 507), a reference section (including, for example, a reference-light optical path fiber 502), an interference section (503), an optical detecting section (including, for example, a photodetector 509), and a signal processing section (511). Each structural element will be described below.

The light source section includes the tunable light source 501 and a light source controller 512 that controls the tunable light source. The tunable light source 501 is connected to a fiber coupler 503, which constitutes the interference section, through an illumination fiber 510.

The fiber coupler 503, which constitutes the interference section, is a single-mode coupler at a wavelength bandwidth of the light source. Various fiber couplers include 3 dB couplers.

A reflecting mirror 504 is connected to the reference-light optical path fiber 502, so that the reference section is formed. The fiber 502 is connected to the fiber coupler 503.

An inspection-light optical path fiber 505, an illumination condenser optical system 506, and the illumination position scanning mirror 507 constitute the measuring section. The inspection-light optical path fiber 505 is connected to the fiber coupler 503. In the fiber coupler 503, back-scattered light, which has been generated from an internal portion and a surface of an inspection object 514, and returning light from the reference section interfere with each other to form interference light.

The optical detecting section includes a light-receiving fiber 508 and the photodetector 509. The interference light that is generated at the fiber coupler 503 is guided to the photodetector 509.

The light received by the photodetector 509 is converted into a spectral signal at the signal processing device 511, and is subjected to Fourier transformation, to obtain information regarding the depth of a test object. The obtained depth information is displayed as a tomographic image on an image output monitor 513.

Here, the signal processing device 511 may be formed of, for example, a personal computer. The image output monitor 513 may be formed of, for example, a display screen of the personal computer.

What is characteristic of the third practical form is the light source section. The tunable light source 501 has its oscillation wavelength and intensity, and their changes with time controlled by the light source controller 512.

The light source controller 512 is connected to the signal processing device 511 that also controls, for example, a drive signal of the illumination position scanning mirror 507, and controls the tunable light source 501 in synchronism with the driving of the scanning mirror 507.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-287923 filed Dec. 28, 2011, which is hereby incorporated by reference herein in its entirety.

What is claimed is:

1. An optical coherence tomography apparatus comprising:
   a first light source that changes a wavelength of light;
   an interference optical system that divides the light from the first light source into illumination light, used for illuminating an object, and reference light, and generates interference light by the reference light and reflected light of the illumination light that has illuminated the object;
   a first optical detector that receives the interference light; and
   an information obtaining section that obtains information of the object on the basis of a temporal waveform of an intensity of the interference light,
   wherein the first light source is a light source that includes a gain medium with an optical gain from which light having a wavelength bandwidth exits, and that, of the light that exits from the gain medium, selects and emits light having a predetermined wavelength using a wavelength selection optical system that selects the light having the predetermined wavelength,
   a second light source that emits light having a particular wavelength to the wavelength selection optical system; and
   a second optical detector that detects the light emitted from the second light source and selected by the wavelength selecting optical system,
   wherein the optical coherence tomography apparatus is formed so that, when light having the particular wavelength is emitted from the first light source, the light emitted from the second light source and selected by the wavelength selection optical system is detected by the second optical detector.

2. The optical coherence tomography apparatus according to claim 1, further comprising:
   a signal transmitter that transmits to the information obtaining section information regarding a time when the light emitted from the second light source is detected by the second optical detector,
   wherein, on the basis of a signal obtained from the signal transmitter, the information obtaining section obtains the information of the object.

3. The optical coherence tomography apparatus according to claim 1, wherein the light emitted from the second light source is not incident upon the gain medium.

4. The optical coherence tomography apparatus according to claim 1, wherein the wavelength selection optical system includes a wavelength selection element and a dispersive element that disperses the light that exits from the gain medium in accordance with wavelengths, and wherein the wavelength selection element selects predetermined light from lights having different wavelengths dispersed by the dispersive element.

5. The optical coherence tomography apparatus according to claim 1, wherein the wavelength selection optical system includes two half mirrors.

6. The optical coherence tomography apparatus according to claim 1, wherein the information obtaining section obtains the information of the object that is obtained when light having a wavelength in a predetermined range is emitted from the first light source, and wherein the particular wavelength corresponds to a shortest wavelength or a longest wavelength among wavelengths in the predetermined range.

7. The optical coherence tomography apparatus according to claim 1, further comprising:
   a third light source that emits light of a wavelength bandwidth differing from and partly overlapping a wavelength bandwidth of the light emitted from the first light source,
   wherein, after a wavelength of the light that is emitted from the first light source is swept over a predetermined range, a wavelength of the light that is emitted from the third light source is swept over a predetermined range to obtain the information of the object, and
   wherein the particular wavelength corresponds to a sweep end wavelength of the first light source or a sweep start wavelength of the third light source.

8. An optical coherence tomography method using an optical coherence tomography apparatus, the method comprising:
   emitting a first light from a first light source, wherein,
      the first light source includes a gain medium and a wavelength selection optical system;
      the gain medium has the ability to generate light, the light generated by the gain medium has a wavelength that is within a wavelength bandwidth;
      wherein a wavelength of the light emitted from the first light source is a predetermined wavelength selected by the wavelength selection optical system;
   emitting light from a second light source having a particular wavelength onto the wavelength selection optical system;
   detecting light from the wavelength selection optical system that is emitted from the second light source with a second optical detector, when the first light emitted from the first light source is the particular wavelength of the second light source;
   dividing the first light into illumination light, and reference light, wherein the illumination light is used to illuminate an object;
   generating interference light with the reference light and light reflected off the object;
   continuously changing the predetermined wavelength of the light that is emitted from the first light source;
   receiving the interference light generated at the interference optical system by a first optical detector and converting it into a temporal waveform; and
   obtaining information of the object on the basis of the temporal waveform of the intensity of the received interference light.

9. The optical coherence tomography apparatus according to claim 1, wherein the light emitted from the second light source is not used for illuminating the object.

* * * * *